(12) United States Patent
Adamiecki et al.

(10) Patent No.: US 7,917,042 B2
(45) Date of Patent: Mar. 29, 2011

(54) HIGH SPEED OPTOELECTRONIC RECEIVER

(75) Inventors: Andrew Adamiecki, Morganville, NJ (US); Lawrence Buhl, New Monmouth, NJ (US); Jeffrey Sinsky, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 812 days.

(21) Appl. No.: 11/772,105

(22) Filed: Jun. 29, 2007

(65) Prior Publication Data
US 2009/0003844 A1    Jan. 1, 2009

(51) Int. Cl.
*H04B 10/06* (2006.01)
(52) U.S. Cl. ......... 398/202; 398/212; 398/214; 398/164
(58) Field of Classification Search .......... 398/202–214; 385/14, 15, 24, 129
See application file for complete search history.

(56) References Cited

U.S. PATENT DOCUMENTS

| 5,270,532 | A | * | 12/1993 | Hietala et al. ............... 250/214.1 |
| 5,611,008 | A | | 3/1997 | Yap |
| 6,304,690 | B1 | * | 10/2001 | Day ............................... 385/24 |
| 6,707,679 | B2 | * | 3/2004 | Yang ............................. 361/752 |
| 2001/0038100 | A1 | * | 11/2001 | Yap ................................. 257/80 |
| 2002/0164107 | A1 | | 11/2002 | Boudreau et al. |
| 2007/0132526 | A1 | | 6/2007 | Wei et al. |

FOREIGN PATENT DOCUMENTS
JP    11 214904 A    8/1999

OTHER PUBLICATIONS

Schubert et al: "107 Gbit/s Trnasmission Using an Integrated ETDM Receiver", ECOC 2006, Sep. 2006, pp. 1-2.*
M. Ushirozawa et al., Small-sized 10 Gb/s Transmitter and Receiver With Modulator Integrated DFB/LD and Multichip-module, XP010303132, Sep. 15, 1996, pp. 195-198.
M. Sakauchi et al., Compact 10Gb/s transponder with FEC function for Tb/s DWDM system, Optical Comm. 2001, ECOC '01, XP010582832, Sep. 30, 2001, pp. 96-97.
K. Takahashi et al., High speed multichip modules using flip chip mount technology for 10 Gbs optical transmission systems, Elec. Comp. and Tech. Conf. 2001, Proceedings, May 29, 2001, pp. 974-979, XP010546231.
Y. Akahori et al., High-Speed Photoreceivers Using Solder Bumps and Microstrip Lines Formed on a Silicon Optical Bench, IEEE Photonics Tech. Letters, vol. 11, No. 4, Apr. 1, 1999, XP011046520.
A. Umbach et al., Photoreceivers for 100 Gbit/s Applications, Jul. 1, 2007, 2007 Digest of the IEEE, pp. 258-259, XP031125424.

* cited by examiner

*Primary Examiner* — Li Liu
(74) *Attorney, Agent, or Firm* — Brosemer, Kolefas & Associates

(57) ABSTRACT

A novel 100+ Gbit/s opto-electronic receiver uses hybrid integration of a photodiode and a demultiplexer. The photodiode converts a high speed optical data stream to an electrical data stream that is input to an electronic demultiplexer. The photodiode and the demultiplexer are connected together by a novel planar microwave transmission structure.

16 Claims, 7 Drawing Sheets

HIGH SPEED OPTOELECTRONIC RECEIVER

CROSS REFERENCE TO RELATED APPLICATION

This application claims the benefit of United States Provisional Application of Andrew L. Adamiecki, Lawrence L. Buhl and Jeffrey H. Sinsky entitled "Ultra-High-Speed Demultiplexing Optical Front End" which was filed on Mar. 14, 2007 the entire file wrapper contents of which are incorporated by reference as if set forth at length herein.

FIELD OF THE INVENTION

This disclosure relates to optical communication. More particularly, this disclosure relates to receivers for high speed optical communication systems.

BACKGROUND OF THE INVENTION

There is a need to convert ultra-high speed optical data streams, for example, optical data at rates greater than about 100 Gbits/sec, into workable electrical data. At data rates greater than 100 Gbits/sec, electrical loss and dispersion of the data signal distort the data thereby reducing performance. Current approaches involve high data rate connectors that increase the cost of the equipment significantly.

More specifically, increasing interest in serial bit rates exceeding 100-Gbit/s for next-generation Ethernet applications requires electronically multiplexed (ETDM) transmitters and receivers operating at 100 Gbit/s and above. At 107 Gbit/s, ETDM transmitters (See, e.g., P. J. Winzer, et al.,"107-Gb/s Optical Signal Generation using Electronic Time-Division Multiplexing", *IEEE JLT*, Vol.24, pp.3107-3113, '06) and receivers (See, e.g., C. Schubert, et al., "107 Gbit/s Transmission Using an Integrated ETDM Receiver," ECOC 2006, Tu1.5.5, September 2006) as well as full ETDM systems (See, e.g., K. Schuh, et al., "100 Gbit/s ETDM transmission system based on We3. P. 124, ECOC'06) have recently been demonstrated using the binary on/off keying (OOK) format. However, both reported ETDM receivers employed a separately packaged photodiode and electronic demultiplexer. When designing ETDM receivers for commercial 100-Gbit/s applications and above, electrical signal transmission between photodetector and demultiplexer is problematic due to reduced performance resulting from microwave signal integrity issues. In fact, electro-optic packaging complexity at this data rate is one of the reasons for the recent push towards optical DQPSK architectures for 100 G systems (See, e.g., P. Winzer, G. Raybon, et al., "10×107-Gb/s NRZ-DQPSK transmission at 1.0 b/s/Hz over 12×100 km including 6 optical routing nodes," to be published ECOC 2007).

SUMMARY OF THE INVENTION

The problems outlined above are solved by directly coupling a high speed photodiode to an electrical demultiplexer for ultra-high speed operation, for example, at data rates greater than about 100 Gbit/sec. In one example of the invention, a photodiode integrated circuit is directly connected to the electrical demultiplexer by means of a short microwave transmission path. In some examples of the invention, this path may entail very short wire bonds, a flip chip architecture, or some sort of short high bandwidth microwave interface board. The photodiode may have its own on-chip transmission line termination, for example, 50 ohms, while the demultiplexer would have a similar termination on-chip. In other embodiments involving a differential demultiplexer, an ultra-broadband external termination may be provided in the required interface circuitry. The photocurrent from the photodiode develops a voltage across the input of the demultiplexer through the termination resistors so as to provide the required input signal for the demultiplexer. The demultiplexer reduces the data rate by at least a factor of two, thereby greatly easing the design requirements for the external microwave circuitry.

One embodiment of the invention described in the aforementioned Provisional Application (See., e.g., J. H. Sinsky, et. al., "107-Gbit/s Opto-Electronic Receiver with Hybrid Integrated Photodetector and Demultiplexer," OFC 2006, PDP30. ) involves hybrid integration of a 100 GHz indium phosphide (InP) photodiode with a silicon germanium (SiGe) high-speed 1:2 electronic demultiplexer in a single package. There are three distinct advantages to this design methodology. First, microwave parasitics, dispersion, and loss between the photodiode output and demultiplexer input are greatly reduced. Secondly, the ultra-high speed electrical connectors (1-mm coaxial), typically required between the photodiode and the demultiplexer, are eliminated from the design, which greatly reduces manufacturing costs. Finally, all external electrical interfaces for clock and data are at ½ the bit rate, easing the requirement on external electronics, similar to that obtained using a higher order constellation, such as DQPSK modulation (See, e.g., A. H. Gnauck, P. J. Winzer, "Optical Phase-Shift-Keyed Transmission," IEEE Journal of Lightwave Technology, Vol. 23, No. 1, January 2005, pp. 115-130).

DETAILED DESCRIPTION

I. Introduction

Figure 1:
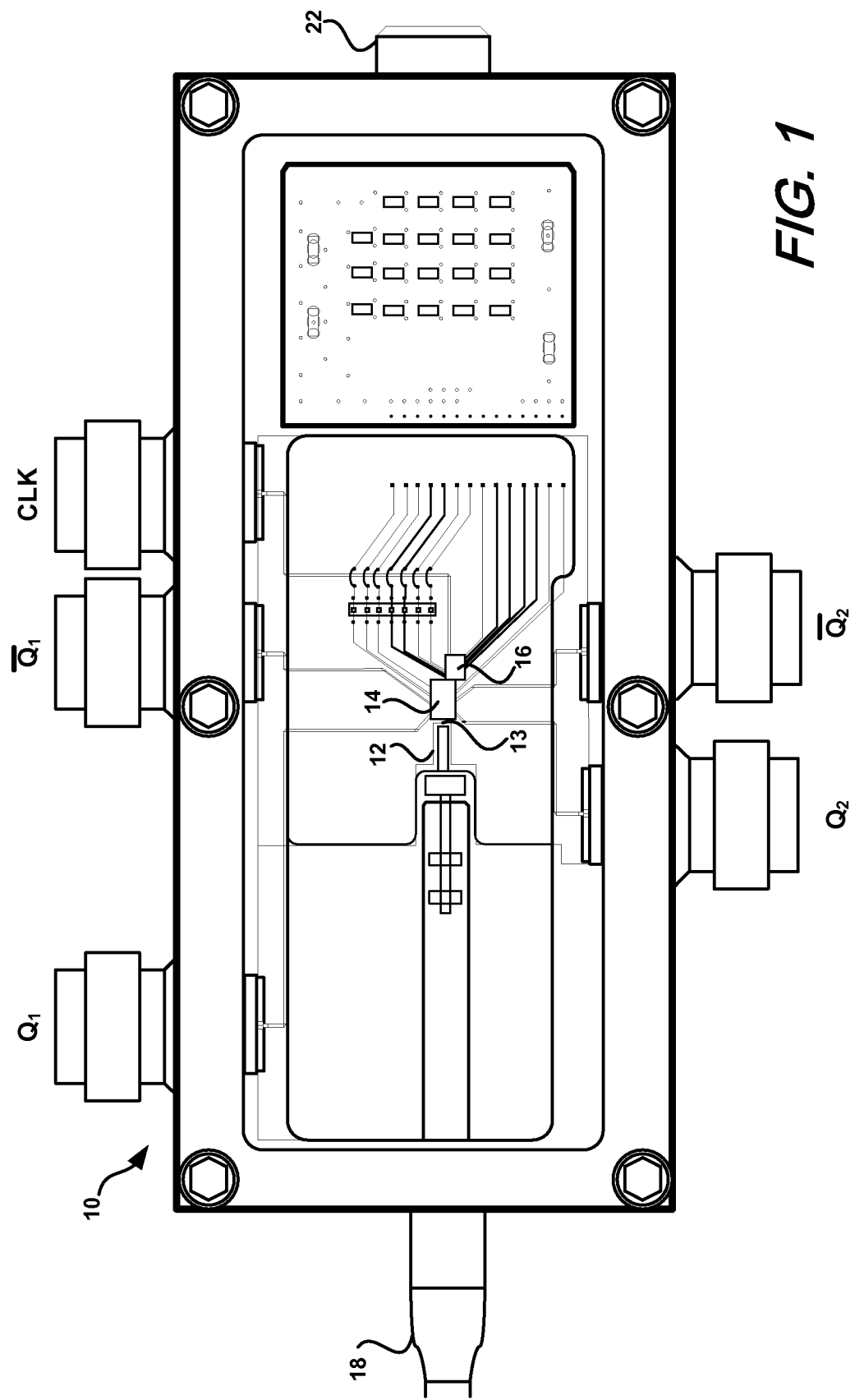
FIG. 1 is a diagram of an illustrative optoelectronic receiver in accordance with the invention.

The basic idea of this invention is to DC couple a high speed photodiode to an electrical demultiplexer for ultra-high speed operation, for example, involving data rates over 100 Gb/s. This is done by directly connecting a photodiode integrated circuit with an electrical demultiplexer by means of a very short microwave transmission path. This path may entail very short wire bonds, a flip chip architecture, or some sort of short high bandwidth microwave planar microwave transmission structure that may be in the form of a small high bandwidth microwave interface board described in detail below. In some embodiments of the invention, the photodiode would typically have its own on-chip transmission line termination (typically 50 ohms) while the demultiplexer would have a similar termination on chip. In the case of a differential demultiplexer, an ultra-broadband external termination is provided in the required interface circuitry. The photocurrent from the diode is used to develop a voltage across the input of the demultiplexer through the termination resistors so as to provide the required input signal. The demultiplexer, by definition, reduces the data rate by at least a factor of two, thereby greatly easing the design requirements for external microwave circuitry.

In one embodiment, a 100 Gbit/s InP photodiode is integrated with a silicon-germanium (SiGe) demultiplexer in a single package. The photodiode has a coplanar waveguide microwave interface with a ground-signal-ground pad set. The demultiplexer has a ground-signal pad set. Both devices are co-packaged in a single mechanical package with the required machining tolerances. The photodiode is interfaced to the demultiplexer using a specially designed grounded coplanar waveguide circuit that transitions a balanced ground-signal-ground interface to an unbalanced ground-signal interface. This interface board is intentionally kept very small (less than a wavelength) to minimize circuit loss. It may be on the order of 0.6 m×1 mm. It is also designed as a 50 ohm transmission line using material parameters that allow it to function well to frequencies over 100 GHz. Additionally, a special via called an "edge via" is used to interface to the unbalanced device (the SiGe demultiplexer) so that the ground currents from the top surface are able to redistribute on the bottom ground face of the board as soon as possible. This is to enhance the broadband performance of the circuit. Both the photodiode and the demultiplexer have built in 50 ohm terminations so that the short microwave transmission structure is properly terminated reducing the incidence of standing waves and reflections. Additionally, the photocurrent developed during operation of the diode flows through the load resistors to generate a voltage on the input of the demultiplexer with adequate amplitude to exceed the sensitivity requirements of the demultiplexer. In some cases, optical preamplification may be used in order to increase the photocurrent to provide an adequate drive voltage. A high speed interface board also contains an integrated termination resistor may terminate the unused second input of a differential demultiplexer.

II. Receiver Design

Figure 2A:
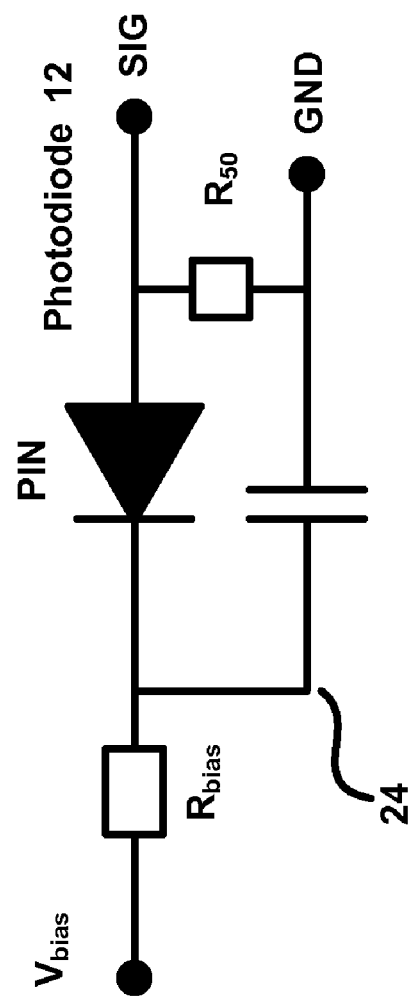
FIG. 2A is an equivalent circuit of an illustrative photodiode that may be used in the embodiment of the invention shown in FIG. 1.

An example of an integrated optical demultiplexing receiver 10 in accordance with the invention is shown in FIG. 1. It has three active circuit components: a 100-GHz 3-dB bandwidth InP photodiode 12 with 0.6 A/W responsivity (See, e.g., A. Beling, et al., "Miniaturized Waveguide-Integrated p-i-n Photodetector With 120-GHz Bandwidth and High Responsivity", IEEE PTL, Vol.17, No. 10, 2152-2154, October 2005), a SiGe 85+ Gbit/s 1:2 electrical demultiplexer 14, and a SiGe traveling wave clock amplifier 16 with a 3-dB bandwidth of about 55 GHz. The optical input 18 in FIG. 1 is a single mode fiber 20 (shown in FIG. 2). Microwave input CLK and microwave outputs $Q_1$, $\overline{Q}_1$, $Q_2$, and $\overline{Q}_2$ are integrated V connectors, and the DC power 22 is provided through a high-density multi-pin connector. The photodiode 12 and the demultiplexer 14 are connected together by a planar microwave transmission structure 13, which may, for example, be a planar transmission line in the form of a thin film of conductive material formed on a dielectric substrate. The photodiode 12, transmission structure 13, and the demultiplexer 14 are mounted on support structure in the housing of the receiver so that these elements are in suitable spatial relationship to one another, for example, so that they are generally coplanar with one another.

A. Active Components

Figure 2B:
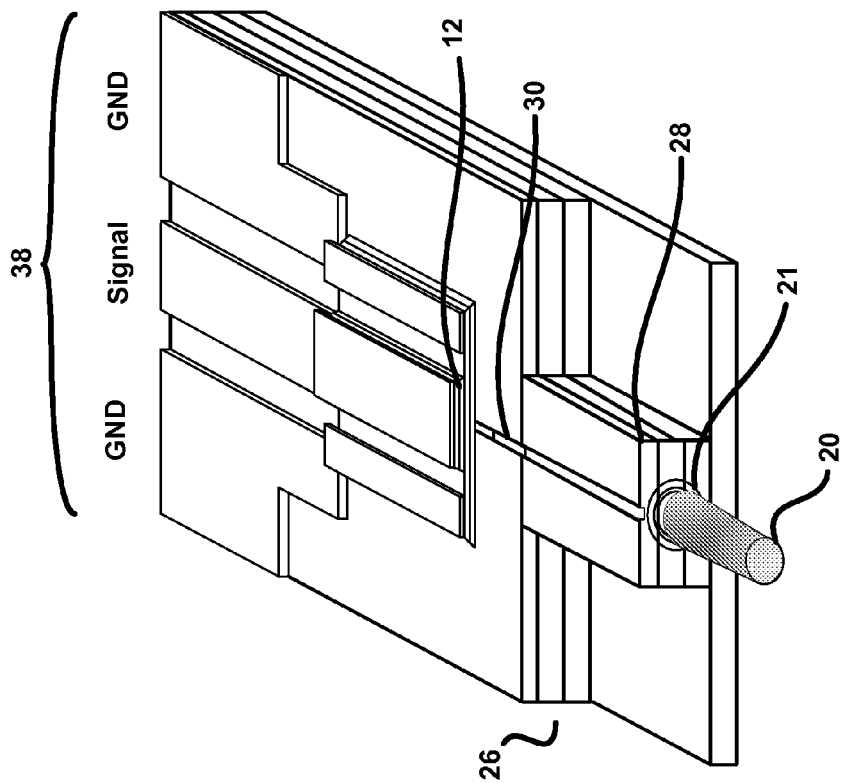
FIG. 2B is a perspective view of a chip containing the photodiode of FIG. 1.

The photodiode 12 is designed with an on-chip biasing network 24 shown in FIG. 2B composed of a bias voltage source $V_{bias}$, a resistor $R_{bias}$, and a capacitor $C_{bias}$. The photodiode 12 also includes an integrated spot-size converter 26 shown in FIG. 2A composed of a taper structure 28 and a waveguide 30 between the fiber 20 and the photodiode 12. The photodiode 12 also has a termination resistor $R_{50}$. For broadband high-speed data transmission, integrating the bias circuitry is necessary to enable DC electrical coupling between the photodiode 12 and the demultiplexer 14. The integrated spot size converter 26 allows for the use of a cleaved fiber that reduces cost, and provides less sensitivity to misalignment. It also reduces vibrational sensitivity of the integrated assembly. This device boasts an external efficiency greater than 50%, a high optical power capability (>+15 dBm), and can sustain an average photocurrent of up to 20 mA.

Figure 3:
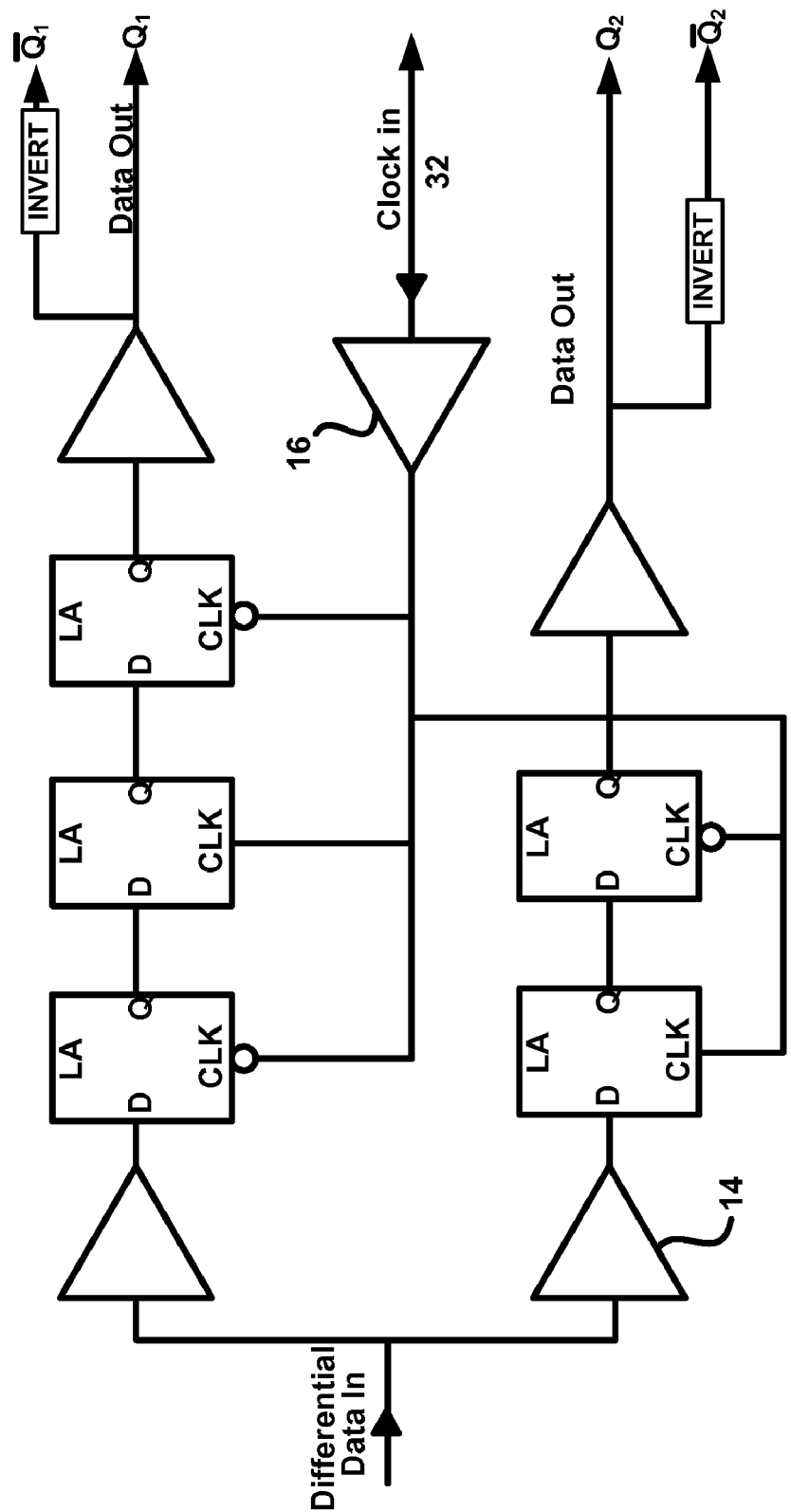
FIG. 3 is a schematic diagram of an illustrative demultiplexer that may be used in the embodiment of the invention shown in FIG. 1.

The electrical demultiplexer 14 is a SiGe integrated circuit originally designed to operate at 85 Gbit/s (See, e.g., O. Wohlgemuth, et al., "Digital SiGe-chips for data transmission up to 85 Gbit/s," EGAAS 2005, 3-4 Oct. 2005, pp.245-248). However, with careful microwave packaging techniques, excellent performance can be achieved at 107 Gbit/s. A schematic diagram of an illustrative demultiplexer 14 is shown in FIG. 3. Data from the photodiode 12 enters two rows of series connected D flip flops that produce the $Q_1$, $\overline{Q}_1$, $Q_2$, and $\overline{Q}_2$ outputs shown in FIG. 1. Data is clocked through the D flip flops by a clock signal 32 amplified by a traveling wave amplifier 16. This device requires a ½ rate clock (53.5 GHz) which latches data on either the rising or falling edge of the clock for each of the respective output tributaries in FIG. 3. As shown in FIG. 3, an extra D flip-flop may be used in one leg of the demultiplexer 14 to equalize the delays from the two data streams.

Figure 3A:
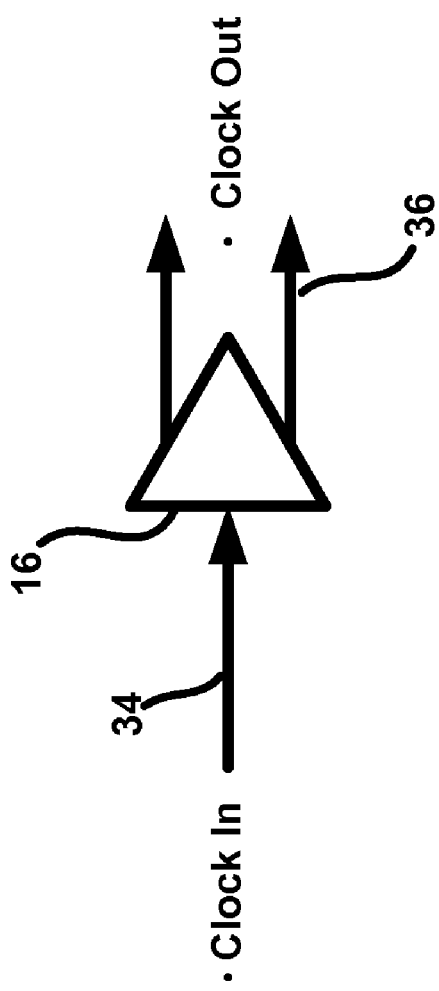
FIG. 3A is a schematic diagram representing a clock driver for the demultiplexer of FIG. 1.

The SiGe clock amplifier 16 of FIG. 3A may have a single-ended input 34 and differential output 36, and has a 3 dB bandwidth of 55 GHz. Since the demultiplexer 14 works better at higher data rates with a differential clock input, the clock device of FIG. 3A allows the provision of a high voltage (~900 mVpp differential) balanced clock from a single ended external source clock.

B. Circuit Architecture

Figure 4:
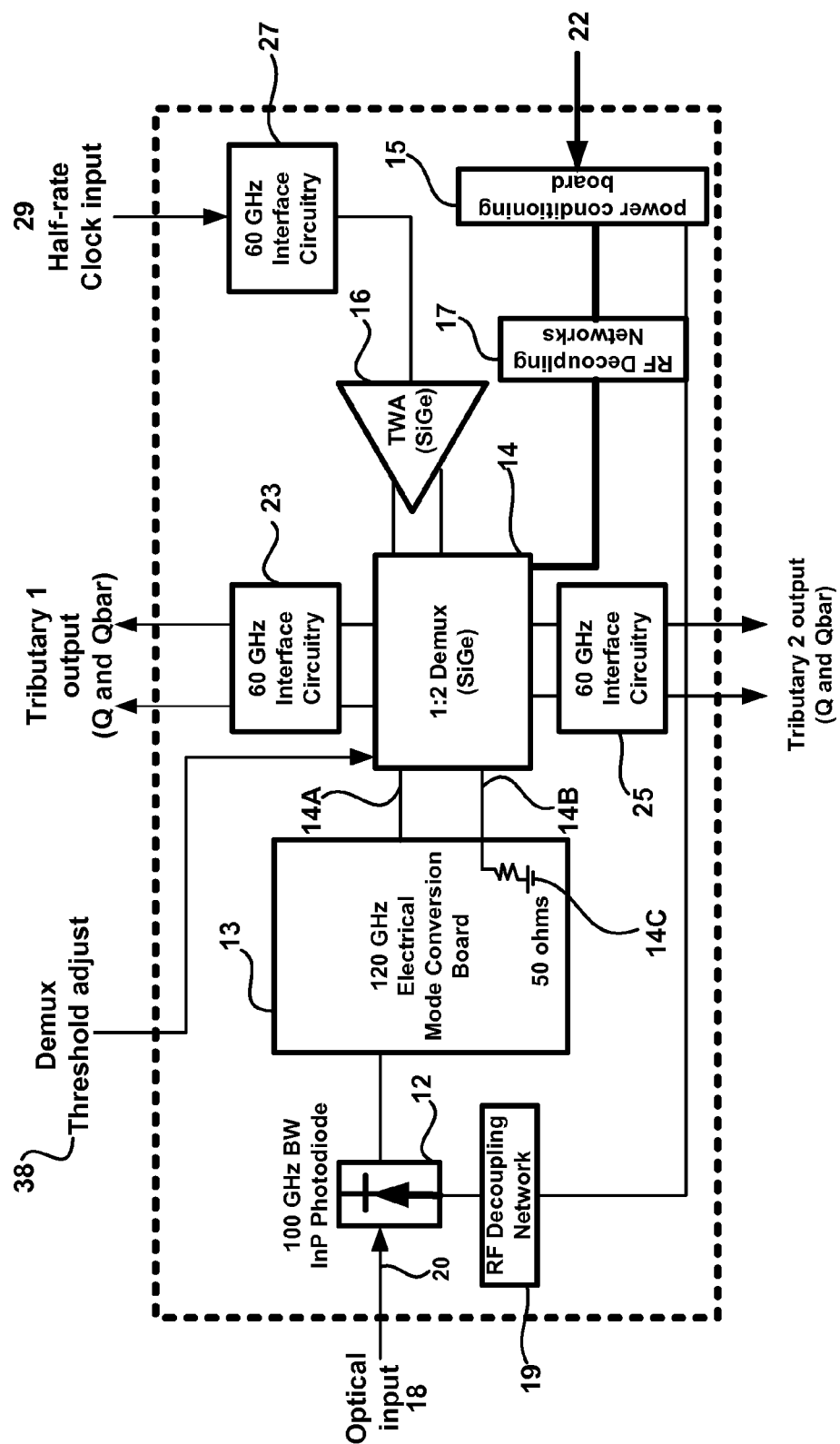
FIG. 4 is a schematic block diagram of an illustrative optoelectronic receiver in accordance with this invention.

The circuit architecture is illustrated in FIG. 4. The photodiode 12 is DC coupled to one of the inputs of a differential demultiplexer 14, thereby minimizing microwave parasitics and improving performance over that which would result from trying to AC couple data from several hundred kHz to nearly 100 GHz to the demultiplexer 14. Secondly, the DC coupled photodiode-demultiplexer interface enables correct biasing of the photodiode 14. Knowledge of the demultiplexer input voltage during normal operation, over the expected range of photocurrents, allows accurate control of the diode bias. Additionally, the demultiplexer 14 has a differential input, composed of inputs 14a and 14b, so the unused input 14b must be presented with a good 50-ohm termination 14c over nearly a 100-GHz bandwidth (BW). This was accomplished using a quartz interface board 13 with a custom designed wideband termination 14c. During operation, a threshold adjust voltage 38 is presented to this terminated side of the demultiplexer 14 so that the voltage across this input of the demultiplexer 14 is approximately equal to the average voltage developed across the photodiode-driven side of the demultiplexer 14.

DC power 22 is supplied to the receiver 10 through a power conditioning board 15. The power conditioning board 15 supplies DC power to the demultiplexer 14 by way of an RF decoupling network 17. The power conditioning board 15 supplies DC power to the photodiode 12 by way of an RF decoupling network 19. Tributary 1 outputs $Q_1$ and $\overline{Q}_1$ of the demultiplexer 14 are output from the receiver 10 by way of interface 23; tributary 2 outputs $Q_2$ and $\overline{Q}_2$ of the demultiplexer 14 are output from the receiver 10 by way of interface 25. A half-rate clock input 29 is supplied to the demultiplexer 14 by means of a traveling wave amplifier 16. Since all 100-GHz interfaces are inside the package, design parameters can be tightly controlled resulting in improved performance. All receiver electrical inputs and outputs operate at half the input data rate, greatly simplifying the external interfaces, which makes this design approach inherently superior to separately packaged solutions with 100-Gbit/s interfaces.

The dimensions of the finished assembly may be is low profile and may measure about 2.6 cm×2.4 cm×6.3 cm. All microwave electronics in the device shown in FIG. 1 may be fabricated on a 127-µm thick quartz substrate. The demultiplexer outputs and clock input travel through the package using microstrip circuitry and are connected to the integrated circuits using wire bonds 40 (FIG. 5) and coplanar waveguide biquadratic transitions for optimal bandwidth performance (See, e.g., W. Thomann, et al., "Characterization and simulation of bi-quadratic coplanar waveguide tapers for time-domain applications," IEEE MTT-S, June 1993, vol. 2, pp. 835-838). All wirebonds are 25.4 µm in diameter and kept as short as possible (approximately 152 µm) in the microwave signal paths. A cleaved fiber 20 couples light into the diode 12 and a ruby ring 21 is used to hold the fiber 20 in place.

C. 120 GHz Interface Board Design Methodology

Figure 5:
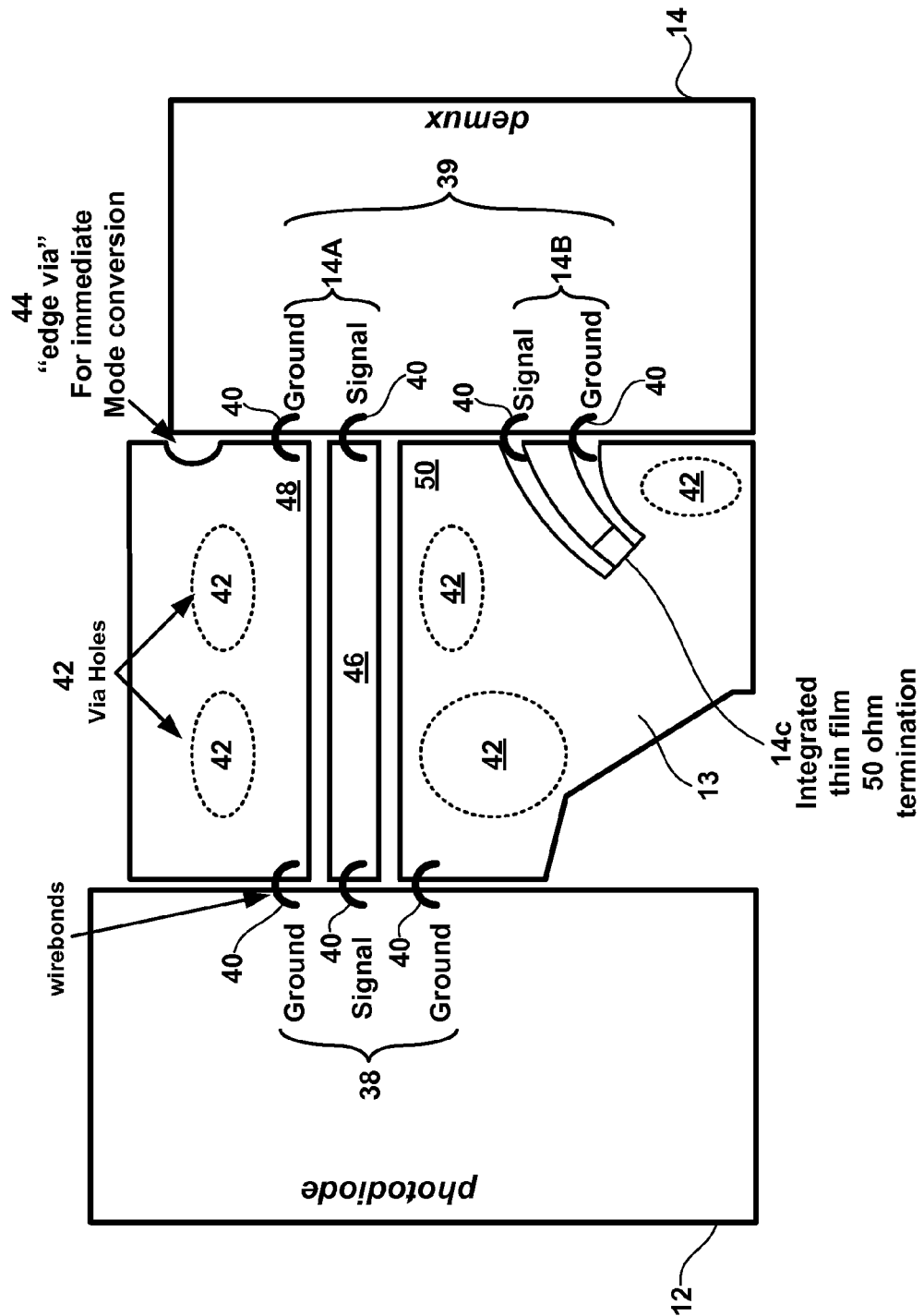
FIG. 5 is a schematic diagram of the mode conversion board shown in FIG. 4.

As mentioned above, key to high speed operation is a very carefully designed interface between the photodiode 12 and the demultiplexer 14. The photodiode 12 has a balanced ground-signal-ground (GSG) electrical interface 38 (FIG. 2B) while the demultiplexer 14 has an unbalanced ground-signal (GS) interface 39 (FIG. 5). Connecting devices like these with different interfaces 38 and 39 will involve a "mode conversion" that can cause serious impairments to the data at 100 Gbits/sec and above. This problem is solved by a GSG to GS mode converter board 13 shown in FIG. 4 and FIG. 5 using a 127-µm thick quartz board as shown in FIG. 5. This circuit effectively converts the unbalanced mode from the diode 12 to a balanced mode for the demultiplexer 14 using strategically placed via holes 42 and a grounded coplanar waveguide transmission structure. This transmission structure comprises a two sided dielectric board having a thin film strip 46 of conductive material formed on the top side of the substrate. A ground plane 48 formed on the top side of the substrate and insulated from the strip 46 of conductive material. Another ground plane 50 is also formed on the top side of the substrate and insulated from the strip 46 conductive material. A third ground plane not shown in FIG. 5 coats the bottom side of the substrate. A set of vias 42 extend through the substrate from the top side to the bottom side and connect the first and second ground planes 48 and 50 to the ground plane on the bottom side of the substrate. To improve performance, an "edge via" 44, in the form of a notch or cutout in the edge of the substrate, is placed near the unbalanced ground pad of the demultiplexer 14, so that the currents can reach the backside ground plane as soon as possible, thus redistributing uniformly before arriving at the other side of the board.

Although a specific embodiment of the invention is described above, the invention is not limited to that embodiment. For example, instead of the embodiment above in which the top sides of the photodiode 12, the mode conversion board 13, and the demultiplexer 14 are all face up and located side by side with wirebonds 40 electrically connecting these components together, the wirebonds 40 can be eliminated by means of a flip chip arrangement involving the ground plane previously on the bottom side of the board 13 now on the top side of the board 13 and the films 14c, 46, 48, and 50 on the bottom side of the board 13 directly contacting the appropriate terminals of the photodiode GSG interface 38 and the differential demultiplexer GS interface 39. Other embodiments will occur to those skilled in the art.

III. Conclusion

Computer simulations show that the 3-dB transmission bandwidth of this embodiment is better than 120 GHz. It is clear that the bandwidth of the passive interface circuitry described above is adequate for 107-Gbit/s applications. We have built and demonstrated the performance of the first 107-Gbit/s integrated demultiplexing opto-electronic receiver. Novel hybrid integration of a photodiode, demultiplexer, and clock amplifier enabled ultra-high-speed performance in a compact package. Combining advanced microwave and optical packaging techniques with emerging InP and SiGe integrated circuit technology, we have achieved the best reported required OSNR (21 dB in a 0.1 nm bandwidth) for an ETDM system operating at 107 Gbit/s at a BER of $10^{-3}$ and for a long ($2^{31}-1$) bit sequence.

The Title, Technical Field, Background, Summary, Brief Description of the Drawings, Detailed Description, and Abstract are meant to illustrate the preferred embodiments of the invention and are not in any way intended to limit the scope of the invention. The scope of the invention is solely defined and limited by the claims set forth below.

The invention claimed is:

1. A high speed optoelectronic receiver, comprising:
    a high speed optical input adapted to receive an optical data stream;
    a photodiode connected to the optical input adapted to produce an electronic data stream corresponding to the optical data stream;
    a demultiplexer having an input adapted to receive the electronic data stream and produce a plurality of lower data rate tributary data streams; and
    a planar transmission line connected between the photodiode and the demultiplexer and adapted to connect the electronic data stream from the photodiode to the input of the demultiplexer, said planar transmission line including
        a planar dielectric substrate having a first side and a second side;
        a strip of conductive material formed on the first side of the substrate;
        a first ground plane formed on the first side of the substrate and insulated from the strip of conductive material;
        a second ground plane formed on the first side of the substrate and insulated from the strip of conductive material;
        a third ground plane formed on the second side of the substrate; and
        at least one via from the first to the second side of the substrate adapted to connect at least one of the first and second ground planes to the third ground plane.

2. The receiver of claim 1, in which the photodiode comprises a ground signal ground interface, comprising:
    a first ground terminal connected to the first ground plane;
    a second ground terminal connected to the second ground plane; and
    a signal terminal connected to the strip of conductive material.

3. The receiver of claim 2, in which the demultiplexer comprises a ground signal interface, comprising:
   a first ground input terminal connected to one of the first and second ground planes; and
   a first signal input terminal connected to the strip of conductive material.

4. The receiver of claim 3, in which the demultiplexer is a differential multiplexer, comprising:
   a second ground input terminal;
   a second signal input terminal; and
   a resistor formed on the substrate that terminates the second ground and signal terminals of the differential multiplexer.

5. The receiver of claim 1, in which the demultiplexer comprises a ground signal interface, comprising:
   a first ground input terminal connected to one of the first and second ground planes; and
   a first signal input terminal connected to the strip of conductive material.

6. The receiver of claim 1, in which the one or more vias comprises an edge via formed in one side of the substrate so that ground currents from the first side of the substrate are able to redistribute on the second side of the substrate as soon as possible to enhance the broadband performance of the receiver.

7. A high speed optoelectronic receiver, comprising:
   a high speed optical input adapted to receive an optical data stream;
   a photodiode connected to the optical input adapted to produce an electronic data stream corresponding to the optical data stream;
   a demultiplexer having an input adapted to receive the electronic data stream and produce a plurality of lower data rate tributary data streams; and
   a planar microwave transmission structure connected between the photodiode and the demultiplexer and adapted to connect the electronic data stream from the photodiode to the input of the demultiplexer
   wherein the transmission structure DC couples the photodiode to the demultiplexer and includes
      a planar dielectric substrate having a first side and a second side;
      a strip of conductive material formed on the first side of the substrate;
      a planar ground structure on the dielectric substrate insulated from the strip of conductive material, said planar ground structure having;
         a first ground plane formed on the first side of the substrate and insulated from the strip of conductive material;
         a second ground plane formed on the first side of the substrate and insulated from the strip of conductive material;
         a third ground plane formed on the second side of the substrate; and
      at least one via from the first to the second side of the substrate adapted to connect at least one of the first and second ground planes to the third ground plane.

8. The receiver of claim 7, in which the photodiode comprises a ground signal ground interface, comprising:
   a first ground terminal connected to the first ground plane;
   a second ground terminal connected to the second ground plane; and
   a signal terminal connected to the strip of conductive material.

9. The receiver of claim 8, in which the demultiplexer comprises a ground signal interface, comprising:
   a first ground input terminal connected to one of the first and second ground planes; and
   a first signal input terminal connected to the strip of conductive material.

10. The receiver of claim 9, in which the demultiplexer is a differential multiplexer, comprising:
    a second ground input terminal;
    a second signal input terminal; and
    a resistor formed on the substrate that terminates the second ground and signal terminals of the differential multiplexer.

11. The receiver of claim 7, in which the demultiplexer comprises a ground signal interface, comprising:
    a first ground input terminal connected to one of the first and second ground planes; and
    a first signal input terminal connected to the strip of conductive material.

12. The receiver of claim 7, in which the one or more vias comprises an edge via formed in one side of the substrate so that ground currents from the first side of the substrate are able to redistribute on the second side of the substrate as soon as possible to enhance the broadband performance of the receiver.

13. The receiver of claim 7, in which the planar microwave transmission structure comprises a thin film waveguide on a dielectric substrate.

14. The receiver of claim 7, in which the planar microwave transmission structure comprises a thin film strip of conductive material and a thin film ground structure insulated from the thin film strip of conductive material, the strip of conductive material and the ground structure being formed on a dielectric substrate.

15. The receiver of claim 14, in which the strip of conductive material and the ground structure are made of gold.

16. The receiver of claim 14, in which the dielectric material is a planar quartz board having a predetermined thickness.

* * * * *